May 28, 1935. G. P. VICKERY 2,003,097
FRUIT SIZER
Filed June 2, 1930 3 Sheets-Sheet 1

INVENTOR.
George P. Vickery
BY
ATTORNEYS.

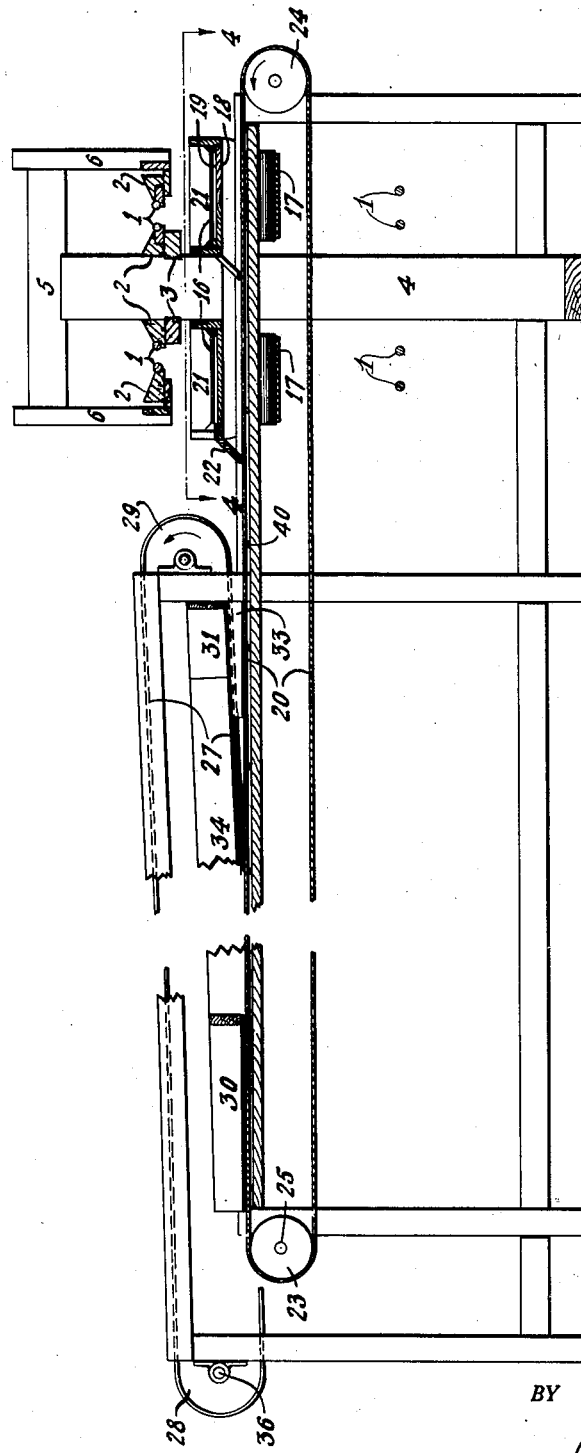

May 28, 1935.  G. P. VICKERY  2,003,097
FRUIT SIZER
Filed June 2, 1930  3 Sheets-Sheet 3
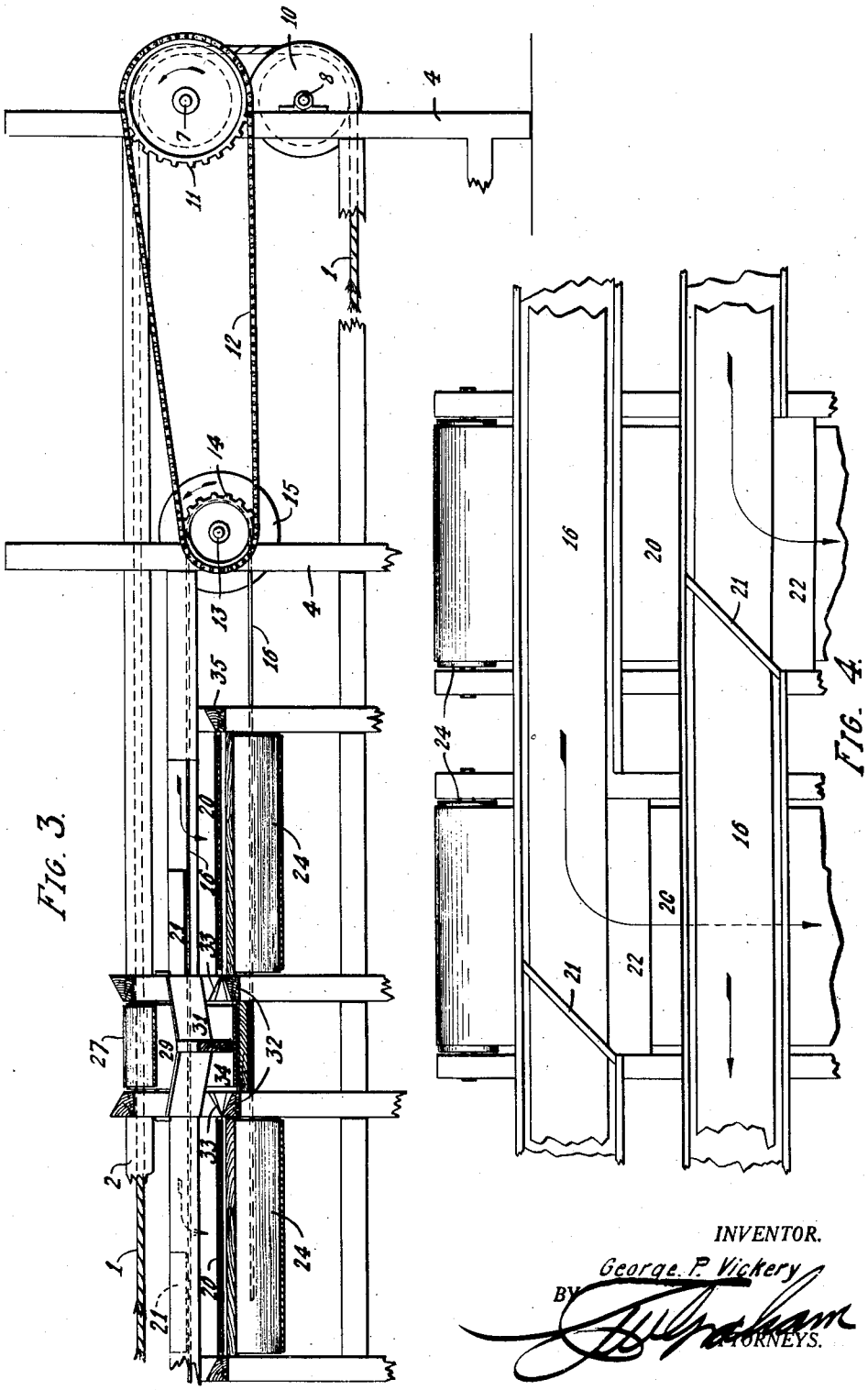
INVENTOR.
George P. Vickery
BY
ATTORNEYS.

Patented May 28, 1935

2,003,097

UNITED STATES PATENT OFFICE 2,003,097

FRUIT SIZER

George P. Vickery, Glendora, Calif., assignor to Food Machinery Corporation, San Jose, Calif., a corporation of Delaware Application June 2, 1930, Serial No. 458,959½

6 Claims. (Cl. 209—71)

The present invention relates to the art of grading fruit according to size and while apparatus embodying the invention is suitable for general use in sizing all kinds of fruit, it is peculiarly well adapted for use in sizing such soft fleshed fruits as pears, peaches, apricots, plums, citrus fruits, etc., which must be handled with extraordinary care in order to prevent damage thereto.

In such machines, it has heretofore been the custom to provide a series of bins to receive the fruit which has been released from the sizing means and it has been found that when running a quantity of fruit through the machine, one of these bins will fill up more rapidly than the others. The reason for this is, that while each crop of fruit is made up of several different sizes, the proportion of fruit of one particular size is usually far greater than that of any one of the other sizes. Due to this fact, the packers at the bin which received the fruit of this particular size are overworked while those at the other bins get an insufficient supply to keep them busy. Since only a limited number of packers can conveniently work at a bin, the capacity of the machine depends upon the capacity of the packers, so that either the machine must run slow enough to allow the packers to keep up with it, or it must be shut down from time to time to enable them to catch up.

Another serious drawback in these machines is the low efficiency of the packers. Since the fruit is released from the sizing means across the entire width of the bins, the fruit in each bin is not all of the same size but varies between certain limits. These sizes are graduated from one side of the bin to the other, so that all the smaller fruit is at one side while all the larger fruit is at the opposite side, with the intermediate sizes in between. The result of this is that the packers are constantly forced to move from one end of the bin to the other in order to select fruit of the proper size for packing.

A further objection to these machines is the damage which results to the fruit, not only by reason of the dropping of the fruit on to the other fruit, thus causing bruises and stem punctures, but also due to the agitation of the fruit by the packers in their efforts to select the proper shapes and sizes to fill the boxes in the desired manner.

It is, therefore, one of the objects of this invention to construct a fruit sizing apparatus which shall have a large capacity, occupy a relatively small floor space and which shall handle the fruit in a gentle manner and allow the packers to pack it efficiently and without any attendant damage thereto.

More particularly, it is an object to construct a fruit sizing apparatus which shall be provided with one or more moving packing conveyors adapted to receive the fruit after it has been separated into groups of the desired size whereby a high degree of flexibility may be secured, the efficiency of the packers increased, and less damage result to the fruit.

It is also an object to provide in a fruit sizing machine one or more moving packing conveyors which shall be adapted to present the fruit to the packers repeatedly until it is packed, thereby eliminating the necessity of using bins of any kind.

A further object of my invention is to provide in a fruit sizing apparatus, a supplementary carrier belt underneath the sizing means which will gently receive the fruit as it is released from the sizing means and deposit it on the afore-mentioned packing conveyor in a single layer.

Another object is to construct an apparatus for sizing fruit which shall be simple, compact, and sturdy in design, and economical and efficient in operation.

Further objects and advantages will become apparent as the description proceeds in connection with the accompanying drawings, in which:—

Fig. 2 is a sectional view taken along the line 2—2 of Fig. 1, looking in the direction of the arrows.

Fig. 3 is a sectional view taken along the line 3—3 of Fig. 1, and drawn to a larger scale.

Fig. 4 is a plan view of a portion of the apparatus shown in Fig. 2, taken along the line 4—4 thereof.

Figure 1:
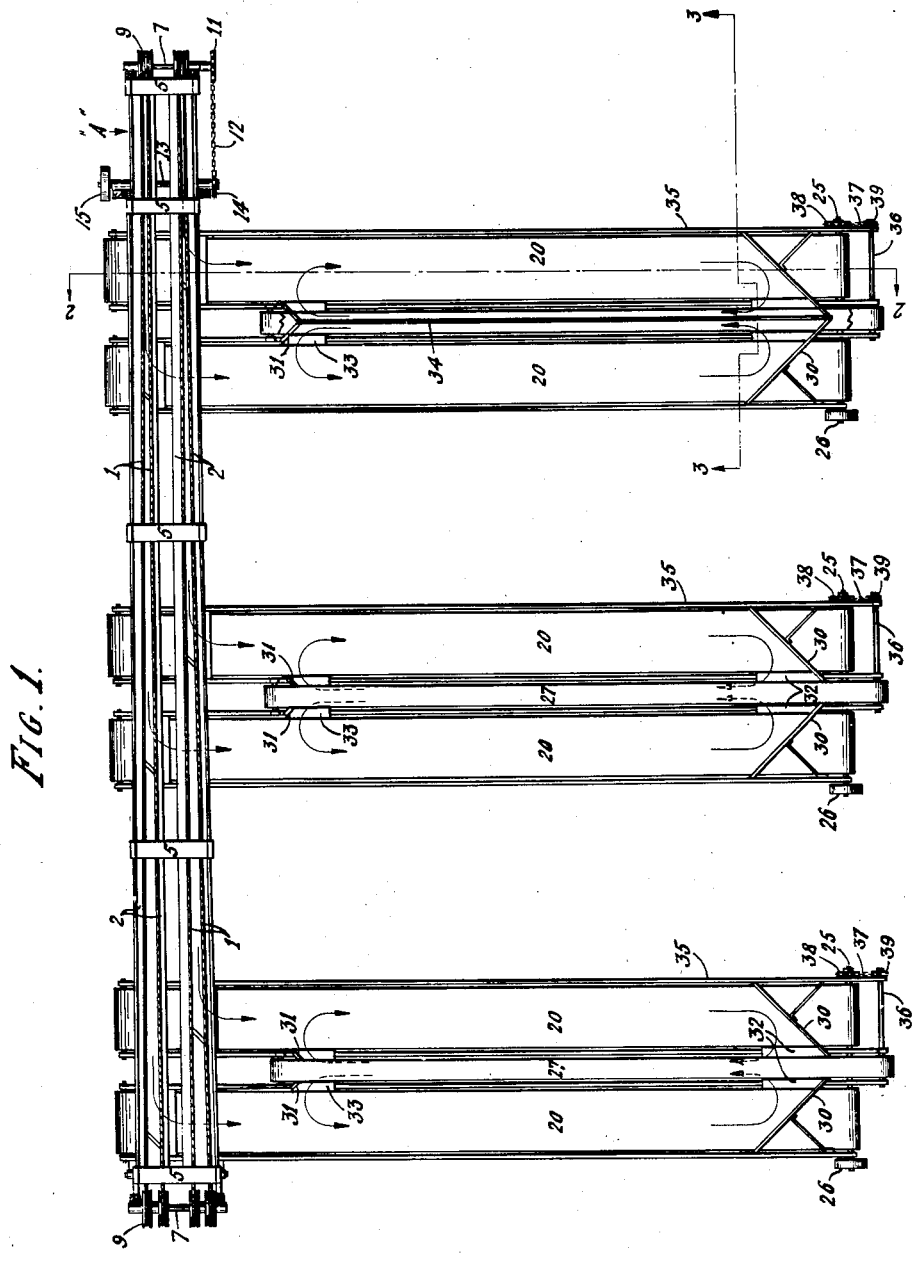
Fig. 1 is a plan view of fruit sizing apparatus embodying my invention.

It is the customary practice to grade the fruit as to quality before grading as to size and the apparatus shown herewith is adapted to size simultaneously two qualities of fruit. To this end there are provided two sets of sizing apparatus mounted side by side.

As shown, the sizing means consists of two pairs of divergently moving ropes 1 which extend the entire length of the machine and are supported by, and operate in, the guides 2. The center guides are supported by the longitudinally extending rails 3 which are attached to suitable uprights 4, placed at spaced intervals throughout the length of the apparatus. The uprights 4 carry cross-arms 5 from which depend the hangers 6 which serve to support the guides for the outer sizing ropes. At each end of the machine are the shafts 7 and 8 which carry the grooved pulleys 9 and 10, over which pass the sizing ropes 1. The shaft 7 is provided with a sprocket 11 which is driven by the chain 12 from the shaft 13 and the sprocket 14. A pulley 15, mounted on the shaft 13 may be connected to any suitable source of power.

In order to catch fruit which has fallen through the sizing ropes and deposit it with its proper group, there are provided the carrier belts 16 mounted directly under the openings between the sizing ropes and spaced therefrom so that the fruit will fall clear of said ropes; the carrier belts pass over the pulleys 17 at each end of the machine and their top runs are supported by the cross-bars 19, mounted at spaced intervals upon the members 18 whereby they are maintained in a horizontal position and yet retain their resiliency so that fruit falling thereon will be gently received.

It is very important that the carrier belts 16 shall run at the same speed as the sizing ropes 1 as otherwise the pieces of fruit upon the carrier belt will not maintain their positions relative to that fruit not yet released from the sizing ropes so that fruit released from the sizing ropes may fall upon or against fruit already deposited on the carrier belts, causing bruises and stem punctures. In order that this may not occur, the proportions of the pulleys 9 and 17 and the gears 11 and 14 have been selected so that the carrier belts and the sizing ropes shall be driven at the same speed.

At suitably spaced intervals, packing conveyors are placed beneath the sizing ropes 1. It will be obvious that any number of such conveyors may be provided but in the apparatus illustrated, I have shown three, each comprising two packing belts 20 and a return belt 27. Deflecting members 21 are disposed above the carrier belts, as shown, to divert the fruit therefrom on to the packing belts and in order to insure a gentle transfer, the ramps 22 are provided which may be formed of a flexible material if desired. Crossbars 40 are disposed beneath the packing belts, and serve the same purpose as the bars 19. The packing belts 20 are supported by the pulleys 23 and 24, the pulleys 23 being driven by the shaft 25 which is provided with the pulley 26, for connection to any suitable source of power.

Between the packing belts of each set operates the return belt 27 which passes around the pulleys 28 and 29. In order to aid the transfer of fruit between the packing belts and the return belts, the return belt is disposed at a slight angle to the horizontal, as shown, so that the receiving end of its lower run is slightly lower than the top of the packing belt and its delivery end is slightly above the packing belt. The deflecting barriers 30 and 31 serve to divert the fruit from one belt to the other in an obvious manner, and at the transfer points the wedges 32 and 33 are placed between the edges of the belts to assist the transfer. The partition 34 serves to maintain the separation between the two grades of fruit, and the shoulders 35 prevent it from rolling off the packing belts. The top run of the return belt 27 may be used as a conveyor for receiving culls and discharging them into any suitable receptacle which may be placed at the outer end of the belt for that purpose. The pulley 28 is operated by means of the shaft 36, driven from the shaft 25, through the medium of the chain 37, passing around the sprockets 38 and 39.

In operation, the fruit is ordinarily graded as to quality before being run through the sizing apparatus although it will be obvious that this may be done after the fruit has been graded according to size. Assuming, however, that the fruit has been graded into two grades of quality, one grade is fed to one of the pairs of sizing ropes and the other is fed to the remaining pair. The fruit is fed to the sizing ropes at the point indicated at "A" by any suitable means. The moving sizing ropes 1 carry the fruit toward the left and as it progresses the ropes diverge to a certain predetermined extent, depending upon the position of the guides 2. That fruit of a size small enough to fall through the sizing ropes is received by the carrier belts 16 which carry it to the proper packing belts and deposit it thereon.

As previously described, the sizing ropes and the carrier belts are moving at the same speed so that the fruit is transferred from the former to the latter in such a gentle manner as to avoid all damage thereto. This result is accomplished by reason of the fact that the fruit carried by the carrier belt maintains its position with respect to that carried by the sizing ropes so that no collisions can occur.

As soon as the fruit is deposited upon a packing belt it is immediately carried away from the carrier belts so that the next fruit cannot fall upon fruit already deposited but will fall upon a clear portion of the packing belt. The packing belts can be of any desired length so that any number of packers may work from alongside. It is thus obvious that there may be room enough so that when a majority of the fruit is of one particular size, the packers can be transferred from other belts to that belt carrying this size, and thus, neither the machine nor the packers need be idle at any time nor will any packer be over-taxed.

Furthermore, it will be seen that since the fruit is deposited in a single layer there is no need for the packers to agitate it in their endeavor to select proper shapes for packing.

Any fruit which may be carried past the packers will be deflected by the barriers 30 onto the return belts 27 which return the fruit to the packing belts whereby it again passes before the packers.

Having thus described my invention, what I claim is new and desire to secure by Letters Patent is:—

1. In a fruit sizing apparatus, means for separating fruit into groups according to size, and a packing conveyor adapted to receive fruit therefrom, said conveyor comprising an endless packing belt, an endless return belt having its lower run disposed alongside the upper run of the packing belt and inclined relative thereto whereby a portion of the lower run of the return belt is higher than the upper run of the packing belt, and a portion thereof is lower than the upper run of the packing belt, means for diverting fruit from the upper run of the packing belt to the lower run of the return belt at a point where the latter is below the former, and means for diverting said fruit back from the lower run of the return belt to the upper run of the packing belt where the former is higher than the latter.

2. In a packing conveyor, an endless packing belt, an endless return belt having its lower run disposed alongside the upper run of the packing belt and inclined relative thereto whereby a portion of the lower run of the return belt is higher than the upper run of the packing belt, and a portion thereof is lower than the upper run of the packing belt, means for diverting articles from the upper run of the packing belt to the lower run of the return belt at a point where the latter is below the former, and means for diverting said articles back from the lower run of the return belt to the upper run of the packing belt where the former is higher than the latter.

3. An apparatus for grading articles according to size comprising a pair of endless longitudinally divergent sizing elements arranged at substantially the same elevation, means for driving the sizing elements to cause articles supported therebetween to be carried along at a uniform speed until released by the divergence of said elements, a carrier extending beneath the sizing elements for receiving and conveying sized articles released therefrom, means for driving the carrier in the same direction and at the same speed as articles are carried along on the sizing elements, and means cooperating with said carrier for discharging articles therefrom at selected points.

4. An apparatus for grading articles according to size comprising a pair of endless longitudinally divergent sizing elements arranged at substantially the same elevation, means for driving the sizing elements to cause articles supported therebetween to be carried along at a uniform speed until released by the divergence of said elements, a carrier extending beneath the sizing elements for receiving and conveying sized articles released therefrom, means for driving the carrier in the same direction and at the same speed as articles are carried along on the sizing elements, a plurality of packing conveyers disposed beneath the carrier, said conveyers being spaced apart to permit movement of packers therebetween and being adapted to convey fruit rapidly over a circuitous route until removed therefrom, and means corresponding to each packing conveyer for cooperation with the carrier to divert fruit from the carrier to the conveyers.

5. In a fruit sizing apparatus, a pair of endless longitudinally divergent sizing elements between which pieces of fruit may be supported and carried along until released by the divergence of said elements, a conveyer extending beneath the sizing elements in position for receiving and conveying sized fruit which has fallen free from engagement with the sizing elements, means for driving both sizing elements and the conveyer in the same direction and at the same speed, and means associated with said conveyer for discharging fruit therefrom at selected points.

6. An apparatus for grading articles according to size comprising a pair of endless longitudinally divergent sizing elements arranged at substantially the same elevation, a carrier extending beneath the sizing elements in position for receiving and conveying sized articles which have fallen free from engagement with the sizing elements, means for driving both sizing elements and the carrier in the same direction and at the same speed, and means cooperating with said carrier for discharging articles therefrom at selected points.

GEORGE P. VICKERY.

CERTIFICATE OF CORRECTION.

Patent No. 2,003,097.            May 28, 1935.

GEORGE P. VICKERY.

It is hereby certified that error appears in the printed specification of the above numbered patent requiring correction as follows: Page 3, first column, lines 18 and 32, claims 3 and 4 respectively, after "elements" insert the words in position; and lines 19 and 33-34, of said claims 3 and 4, strike out the words "released therefrom" and insert the words which have fallen free from engagement with the sizing elements; and that the said Letters Patent should be read with these corrections therein that the same may conform to the record of the case in the Patent Office.

Signed and sealed this 27th day of August, A. D. 1935.

(Seal)                                                               Leslie Frazer
                                                                      Acting Commissioner of Patents.